United States Patent
Fitz et al.

(10) Patent No.: US 8,565,564 B2
(45) Date of Patent: Oct. 22, 2013

(54) BUNDLED OPTICAL FIBER CABLE WITH GROOVED JACKET

(75) Inventors: Jonathan Gerald Fitz, W. Columbia, SC (US); Ben H. Wells, Columbia, SC (US); Mauricio Silva, Columbia, SC (US)

(73) Assignee: Prysmian Communications Cables and Systems USA, LLC, Lexington, SC (US)

( * ) Notice: Subject to any disclaimer, the term of this patent is extended or adjusted under 35 U.S.C. 154(b) by 425 days.

(21) Appl. No.: 12/923,250

(22) Filed: Sep. 10, 2010

(65) Prior Publication Data

US 2012/0063731 A1    Mar. 15, 2012

(51) Int. Cl.
*G02B 6/44*       (2006.01)

(52) U.S. Cl.
USPC .......................................... 385/104; 385/111

(58) Field of Classification Search
USPC .................................................. 385/104, 111
See application file for complete search history.

(56) References Cited

U.S. PATENT DOCUMENTS

| | | | |
|---|---|---|---|
| 4,828,352 A | | 5/1989 | Kraft |
| 5,173,961 A | * | 12/1992 | Chiasson ...................... 385/113 |
| 6,603,908 B2 | | 8/2003 | Dallas et al. |
| 7,054,531 B2 | | 5/2006 | Hurley et al. |
| 7,123,801 B2 | * | 10/2006 | Fitz ............................... 385/105 |
| 7,403,687 B2 | | 7/2008 | Smith |

FOREIGN PATENT DOCUMENTS

JP         62049310 A       3/1987

* cited by examiner

*Primary Examiner* — Uyen Chau N Le
*Assistant Examiner* — Kajli Prince
(74) *Attorney, Agent, or Firm* — Finnegan, Henderson, Farabow, Garrett & Dunner, L.L.P.

(57) ABSTRACT

An optical fiber cable for bundled drop applications has a plurality of optical fiber sub-units stranded together in an S-Z lay configuration and a jacket surrounding and holding the sub-units in the S-Z configuration without assistance from binder threads. The jacket contacts at least some of the sub-units and has one, but preferably at least two, longitudinally disposed grooves on an external surface. With at least two grooves, the sub-units are accessed by bending the cable until the jacket buckles between the grooves, cutting the jacket at the buckle, and peeling back a portion of the jacket longitudinally between the grooves.

18 Claims, 5 Drawing Sheets

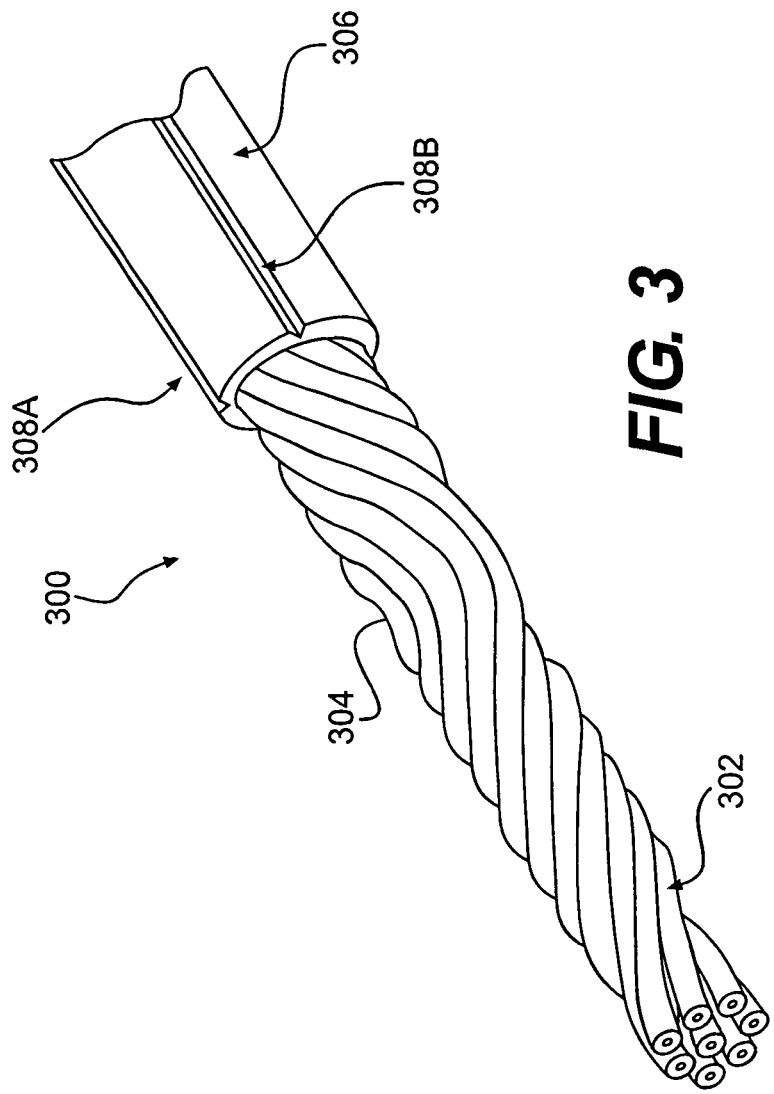

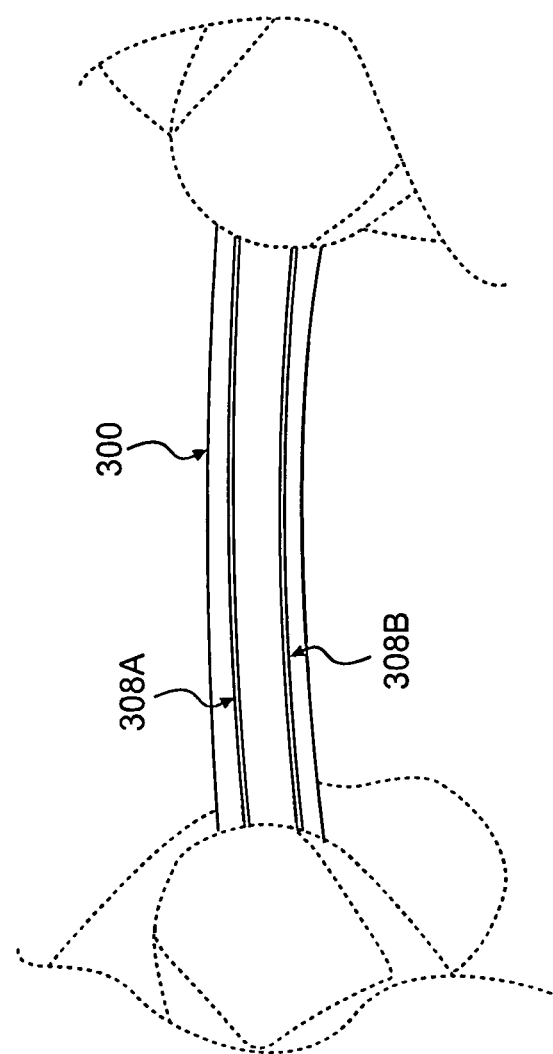

BUNDLED OPTICAL FIBER CABLE WITH GROOVED JACKET

TECHNICAL FIELD

The present invention relates to telecommunications cables for bundled drop applications having a plurality of optical fibers. More particularly, the present invention relates to an optical cable having a grooved jacket to facilitate access to a plurality of optical fibers within the cable.

BACKGROUND

Optical fibers were first deployed in telecommunications primarily as a medium for transmitting information across long distances. In that role, optical fibers carried voice and data traffic between switching points separated by distances of several or more kilometers. In many networks, however, electrical conductors continued to be used to connect the switching points with the sender and receiver of the communications. Therefore, as an example, data transmitted from a business to a home would first pass through a network of electrical conductors between the business location and a first switching point, then pass through optical fibers across a long distance to a second switching point, and finally pass through another network of electrical conductors to arrive at the home.

Increasingly, optical fibers are replacing electrical conductors within the short distances between switching points and the ultimate sender and recipient of communications. This portion of the telecommunications network is often referred to as the "last mile" of the telecommunications network. Providing a complete optical-fiber path between a source of data and a recipient will enable more use of high-bandwidth applications and is part of a movement known as Fiber to the Home (FTTH), Fiber to the Premises (FTTH), and other generally FTTx.

Besides providing optical fiber to individual residences, FTTx contemplates the installation of optical fiber to multiple dwelling units (MDUs). MDUs are buildings in which a large number of people require separate access to telecommunications through the optical network. In particular, MDUs may include apartment buildings, condominiums, townhouses, dormitories, and hotels. Although not residences, MDUs may also include office buildings, schools, and factories.

MDUs can present a substantially different environment for installing optical fibers and cables than a single-family residence, or single dwelling unit (SDU). With an SDU, it is often most practical to span the final network segment (to the residence) with a single fiber drop. On the other hand, MDUs may have individual residences that are in close proximity to each other. Consequently, although single fiber drops can be used, it will be less time consuming to pull multiple drop cables in a single operation.

Indoor optical cables are well known. Among other criteria, these cables are generally requested to have sufficient flexibility and tensile strength and be flame retardant. Several standards of the National Electric Code (NEC) and other organizations specify performance requirements. Indoor optical cables are often rated for either riser (vertical) or plenum (horizontal) applications.

The most basic type of indoor optical cable is called "simplex" cable. By "optical cable," it is meant a cable having at least one optical fiber, which fiber comprises an optical transmissive core generally made of glass and a polymeric coating, usually made of a resin that is typically curable with ultraviolet or infrared light. In the simplex design, a single optical fiber is directly coated with a protective layer of polymeric extrudable material, known as being tight-buffered. The tight-buffered optical fiber is usually surrounded with a reinforcing layer, typically based on aramid yarn, and then surrounded by a flame-retardant jacket. With this form, the simplex cable can easily be bent and routed through small spaces in a building. Moreover, tight-buffered cables may be directly connectorized. U.S. Pat. No. 7,403,687 describes several exemplary types of simplex cables.

While potentially satisfactory for SDUs, simplex cables can be insufficient for wiring an MDU. For example, simplex cables contain only one fiber, and pulling individual cables for each resident within an MDU can be time-consuming. Also, depending on the type of installation and the size of the cables, many simplex cables within an MDU can result in an unsightly installation.

Other types of indoor optical cables contain multiple tight-buffered optical fibers. Premises distribution cables, for example, contain several tight-buffered fibers bundled under the same jacket with strength members to stiffen the cable. These cables are small in size and used for short runs within building conduits. But because the fibers are not individually reinforced or robust, accessing the cable within the field can be difficult without damaging the fibers. They require a "breakout box" or junction box to be terminated, which can restrict their utility.

Premises breakout cables, or fan-out cables, are more robust than distribution cables. Breakout cables generally comprise simplex cables bundled together. Each fiber is reinforced, so breakout cables allow for quick termination to connectors without the need for a breakout box or junction box. Nonetheless, accessing the fibers within a conventional breakout cable can be challenging, especially if midspan access is desired.

FIGS. 1 and 2 depict two examples of conventional breakout cables. FIG. 1 illustrates a breakout cable 100 having two sub-units 102 each comprising a 900 µm tight-buffered optical fiber 104, a dielectric strength member 106 around the optical fiber 104, and flame-retardant jacket 108. Cable 100 includes an outer jacket 110 to encase and protect the sub-units 102 and ripcord 112 to make opening the jacket 110 easier. Although not shown, sub-units 102 are often S-Z stranded and held together with binder threads. FIG. 2 shows a breakout cable 200 that is substantially the same as cable 100 but with more sub-units 102. In this embodiment of FIG. 2, subunits 102 are arranged in two layers around a dielectric central member 202. Binder threads not shown typically hold sub-units 102 in place.

Removing the jacket in a conventional breakout cable, such as those shown in FIGS. 1 and 2, is burdensome because many steps are required. First, the jacket must be ring-cut at two points in close proximity. Typically, the ring cuts are between 7 cm and 15 cm apart, depending on the toughness of the jacket and the strength of the ripcord. Second, a longitudinal cut is extended from one ring-cut to the other. During each of these cuts, great care must be taken to avoid cutting too deeply, so as to avoid damaging the underlying sub-units. Third, after removing the cut section of the jacket, the ripcord needs to be located, severed, gripped with pliers at one end, and pulled to tear the jacket longitudinally to whatever length is desired.

Some options have been disclosed for easing access to optical fibers within a cable. For example, U.S. Pat. No. 6,603,908 discloses a buffer tube that purports to allow easy access to signal carrying fibers disposed within the buffer tube. In one embodiment of the '908 patent, grooves or indents are continuously or sequentially incorporated into the buffer tubes as stress risers. These stress risers reduce the energy needed to tear into the buffer tube with a ripcord or eliminate the need for a ripcord altogether. The stress risers can be formed on an inner or outer surface of the buffer tube and may be such that bending or twisting will cause seams in the tube to split. Even abrading the exterior of the buffer tube with a material such as sandpaper may be a sufficient approach to weaken and open the buffer tube. The '908 patent appears to only consider providing easier access to optical fibers within buffer tubes, the buffer tubes being enclosed in larger cables and protected by an outer jacket and other conventional materials.

U.S. Pat. No. 7,123,801 relates to optical fiber cables having a central strength member encircled by a circumferentially continuous jacket or sheath. The sheath has at least one longitudinally extending chamber or duct that receives one or more optical fibers, the jacket being manually separable from the strength member. The slots or ducts can extend helically around the strength member but, preferably, the slots or ducts extend around the strength member in S-Z, or alternating lay, fashion. The outer surface of the jacket bears indicia that will identify the location of the slots or ducts in the jacket. The indicia can be grooves in the outer surface, which can be lines of weakening for removing the jacket and/or guides for a cutting tool for cutting the jacket. The manufacturing of such a cable involving ducts for optical fibers can be complicated and expensive.

The abstract of JP1987-049310 relates to a tube for optical fibers having two continuous grooves with V-shaped sections. For instance, the inner diameter of a plastic tube is 3.3 mm, and its outer diameter is 5 mm. Two V-shaped grooves are formed on the outer surface of the tube in parallel with the axis of the tube, and the depth of the grooves is 0.5 mm. Consequently, the tube can be easily cut off by using the V-shaped grooves. The optical fibers appear to be in ribbon format, and the document does not indicate any type of stranding or binding for the fibers.

U.S. Pat. No. 7,054,531 discloses an optical fiber premises cable with a plurality of unit cables. Each unit cable contains a plurality of tight-buffered optical fibers surrounded by a thin polymeric non-load bearing tube. According to the '531 patent, the unit cables aid in segregating and identifying individual tight-buffered optical fibers. The unit jackets are relatively thin and intended to be weak and easily severed. They are not intended to provide physical protection for the tight-buffered optical fibers. Instead, protection is provided by strength members, such as aramid fibers, that are located within the outer cable jacket of the unitized cable rather than directly around the tight-buffered optical fibers within the unit jackets.

U.S. Pat. No. 4,828,352 relates to a fiber optic cable containing a core of S-Z stranded optical fibers composed of first and second alternatingly repeating and essentially equal first and second sections. The optical fiber layers are circumscribed by a plastic sheath in which there is a plurality of grooves in the jacket marking the general vicinity where the first section of the S-Z stranding joins the second section. The grooves are provided perpendicular to the axis of the cable.

Another option for easing the ability to access optical fibers within an optical cable is to eliminate the jacket entirely. This product is essentially an unjacketed breakout cable. In general, an unjacketed breakout cable (or fan-out cable) contains individual simplex sub-units stranded or bundled together and held in place with binder threads. The individual sub-units can be sized to meet the application. Problems with accessing the optical fibers are avoided because there is no jacket to remove.

An unjacketed breakout cable has several disadvantages, however. For instance, during manufacturing, the process for binding the sub-units together is typically very slow relative to standard jacketing operations. During installation, the binders can impede pulling operations. Each wrap of the binder presents an opportunity for a snag if the cable is pulled over an edge or against a rough surface. During the splicing or accessing process, it can be tedious to remove the helical binders from long sections of the cable. To be effective, the binders must have a relatively short pitch (typically 1-3 cm). This means that the installer must make many cuts per meter of exposed cable (typically 1-3 m total). Also, to keep the binder threads from unwinding beyond the segments which are meant to be accessed, the end points of the segments to be accessed must be secured with tape or other materials. In addition, because the sub-units are normally stranded together with a continuous helix, they must be "unwound" to be separated from the cable. For cables having higher fiber counts (typically six or higher), two layers of sub-units are necessary, and each layer has its own binders, which can further complicate the accessing process.

Applicant has observed that known designs for bundled drop cable applications are not satisfactory for use in wiring MDUs. Those designs do not provide optical fibers of sufficient quantity or robustness to permit rapid wiring of the many residences or units within a large building. They also do not provide adequate means to access the optical fibers within the cable jacket, instead requiring tedious steps to perform a splicing and termination operation.

Applicant has found that an optical cable of many simplex sub-units that could be manufactured quickly and would be capable of being pulled and installed through an MDU in a single operation, while allowing individual sub-units of the cable to be readily separated for access and termination, would overcome the disadvantages observed in the art and fulfill a need in the industry.

For the purpose of the present description and of the appended claims, except where otherwise indicated, all numbers expressing amounts, quantities, percentages, and so forth, are to be understood as being modified in all instances by the term "about." Also, all ranges include any combination of the maximum and minimum points disclosed and include any intermediate ranges therein, which may or may not be specifically enumerated herein.

SUMMARY

Optical cables for bundled drop applications are needed that can be manufactured quickly, installed in MDUs to service many users in a dense environment, and accessed quickly and safely for splicing and termination. Applicant has found that an optical cable for bundled drop applications having a plurality of optical fiber sub-units stranded together in an S-Z lay configuration, rather than being helically wound, and being held together and in position by a thin jacket surrounding the sub-units, without the assistance of binder threads, can improve the ease of accessing the sub-units when the jacket has at least two longitudinally disposed stress concentrators in the form of grooves.

In accordance with disclosed embodiments, an optical fiber cable for bundled drop applications includes a plurality of optical fiber sub-units stranded together in an S-Z lay configuration and a jacket surrounding and holding the sub-units in the S-Z configuration. The cable may not include binder threads, so the sub-units are held in position without assistance from binder threads. The jacket contacts at least some of the sub-units it surrounds and has at least one longitudinally disposed groove on an external surface. Preferably, the jacket includes at least two longitudinally disposed grooves. The grooves, which function as areas of weakness in the jacket, facilitate accessing the sub-units when a portion of the jacket between the grooves is peeled back and apart from the rest of the jacket.

In one aspect, sub-units with the cable are tight-buffered optical fibers and in another aspect they are selected from the group consisting of loose optical fibers in tubes, optical fibers, and optical fiber ribbons. Powder may be dispersed around the sub-units to prevent the jacket from adhering to the sub-units, and aramid fibers may be added to improve strength. Additionally, especially for outdoor MDU applications, superabsorbant (SAP) elements, i.e. SAP powder, SAP impregnated yarn, tape, or scrim, may be included under the jacket.

The jacket is sufficiently pliable to buckle between the grooves when bent. In one embodiment, the jacket has a thickness of between about 0.15 mm and 1.3 mm.

The depth of each of the grooves in the cable is sufficient to permit peeling by hand the jacket material away from the cable between the grooves. Preferably, the jacket has a thickness and the grooves have a depth of at least 15% of the thickness. In one embodiment, the grooves have a depth of between about 0.1 mm and 1.0 mm.

Another aspect of the invention includes a method of accessing optical fiber sub-units in an optical fiber cable for bundled drop applications. The optical fiber cable includes a plurality of optical fiber sub-units stranded together in an S-Z lay configuration, and a jacket surrounding and holding the sub-units in the S-Z configuration without assistance from binder threads, wherein the jacket has at least two longitudinally disposed grooves to facilitate opening the jacket to access the sub-units.

The method includes bending the optical fiber cable until the jacket buckles between the longitudinal grooves; cutting the jacket within the buckled segment and between the longitudinal grooves at a cutting location; and peeling a portion of the jacket longitudinally between the grooves, starting at the cutting location, thereby revealing the optical fiber sub-units enclosed within the jacket.

In accordance with yet another embodiment, an optical cable for rapid access and splicing of optical fibers consists essentially of a plurality of the optical fibers stranded in an S-Z configuration, the optical fibers being tight-buffered; and a jacket encasing the optical fibers and holding the optical fibers in the S-Z configuration, the jacket including on an exterior surface at least one groove, and preferably two grooves, arranged longitudinally along the cable. The jacket is sufficiently pliable to buckle between two grooves when bent. The two grooves may be substantially parallel to each other, and at least one of the grooves may be substantially parallel to a longitudinal axis of the cable.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIG. 3 is a perspective view of an optical fiber cable having a grooved jacket consistent with certain disclosed embodiments.

FIG. 4A is a side view of the optical fiber cable of FIG. 3 in a first step of accessing the optical fibers according to a method consistent with certain disclosed embodiments.

DESCRIPTION OF THE EMBODIMENTS

Figure 2:
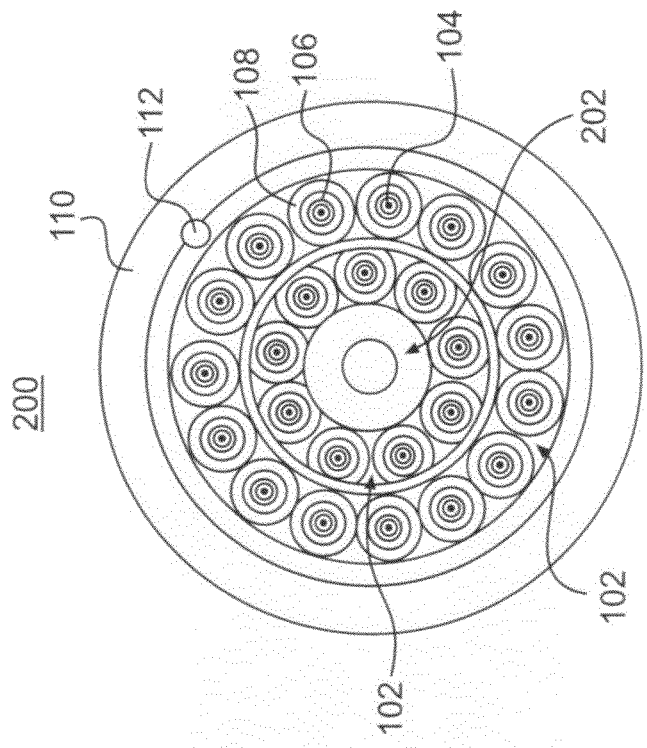
FIG. 2 is a cross-sectional view of a conventional breakout cable having two layers of multiple sub-units.

Reference will now be made in detail to the present exemplary embodiments of the invention, examples of which are illustrated in the accompanying drawings. The present disclosure, however, may be embodied in many different forms and should not be construed as limited to the embodiments set forth herein. In the drawings, wherever possible, like numbers refer to like elements.

In accordance with embodiments disclosed herein, an optical fiber cable for bundled drop applications includes a plurality of optical fiber sub-units stranded together in an S-Z lay configuration, and a jacket surrounding and holding the sub-units in the S-Z configuration without assistance from binder threads. The jacket contacts at least some of the sub-units within its interior and has at least one longitudinally disposed groove, and preferably at least two longitudinally disposed grooves, on an external surface of the jacket to facilitate accessing the sub-units.

As embodied herein and generally depicted as 300 in FIG. 3, the optical cable includes a plurality of optical fiber sub-units referenced as 302. Sub-units 302 are preferably tight-buffered optical fibers having an outer diameter of from 600 to 1200 microns, preferably of 900 microns as commonly used in simplex and premises breakout (or fan-out) cables. In applications not requiring as much robustness, sub-units 302 alternatively may be tight-buffered optical fibers having an outer diameter of 600 microns, as commonly used in simplex cables and premises distribution cables.

Sub-units 302 are preferably simplex units having OFNR, OFNP, or OFNG ratings. As known in the art, OFNR is the designation given by the National Fire Protection Association (NFPA) to interior optical fiber cables that contain no electrically conductive component and that are certified for use in riser applications. Similarly, OFNP is the designation given by the NFPA to interior optical fiber cables that contain no electrically conductive component and that are certified for use in plenum applications. OFNG is the designation given by the NFPA to interior optical fiber cables that contain no electrically conductive component and that are certified for general applications on a single floor.

Sub-units 302 may be of the bend-insensitive type of optical fibers. Bend-insensitive fibers can be bent around curves of a small radius without significant signal loss. These include, for example, BendBright® fiber available from Draqa Comteq of Claremont, N.C. or ClearCurve® fiber available from Corning Inc. of Corning, N.Y.

Figure 1:
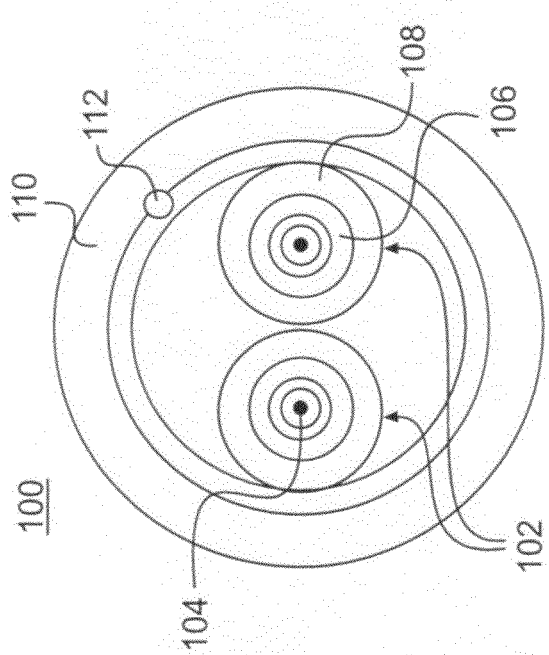
FIG. 1 is a cross-sectional view of a conventional breakout cable having two sub-units.

In general, sub-units 302 may be any type of optical-fiber configuration, including fibers loosely held in buffer tubes, tight-buffered fibers, bare fibers, or optical-fiber ribbon units. As depicted in FIG. 1, sub-units 302 are tight-buffered optical fibers.

Cable 300 includes at least two sub-units 302. In one embodiment, cable 300 holds 12 sub-units, although the number of sub-units may be more and is not a critical parameter for cable 300.

FIG. 1 illustrates sub-units 11 stranded in an S-Z configuration. S-Z stranding is well known in the art and refers to a reverse-lay method of twisting sub-units. In particular, according to S-Z stranding, a twisted stranding is imparted to the grouped sub-units during manufacturing and, after a predetermined number of revolutions, the direction of twisting is reversed. At the point of reversal, the sub-units lay parallel to the longitudinal axis of the cable, as shown at 304 in FIG. 3.

The lay length and pitch of the S-Z stranding are dependent primarily on the particular application for cable 300 and are not critical to the features of the cable. In one embodiment, cable 300 holds twelve sub-units 302 in an S-Z configuration with a lay length of approximately 1 meter. The reversal of the lay direction occurs approximately every 1.5 turns.

Unlike typical stranding of premises cables or of S-Z stranding in general, the collection of S-Z stranded optical fiber sub-units 302 for cable 300 do not include binder threads. Without assistance from binders, the stranded sub-units 302 are instead held together and in place by their stranding and by the encasing of jacket 306 that surrounds them. In encasing sub-units 302, jacket 306 contacts at least some of the sub-units while helping to hold them in place.

Jacket 306 is a thin material that may be severed and torn at the stress concentrators without significant force. Preferably, jacket 306 is polyvinyl chloride (PVC) or another material such as a low smoke, zero halogen material that can meet the OFNR, OFNP, or OFNG rating for the particular cable application. Possible examples for the jacket include medium density polyethylene (MDPE), high density polyethylene (HDPE), and flame retardant polyethylene (FRPE). Others include polypropylene random copolymer with a flame retardant filler, such as magnesium hydroxide or alumina trihydrate.

Jacket 306 may have any thickness sufficient to achieve the desired functionality discussed herein, but preferably the jacket thickness is between about 0.15 mm to 1.3 mm. In one embodiment, jacket 306 is PVC with a thickness of approximately 0.5 mm and an average outer diameter of 7.5 mm.

The exterior of jacket 306 should be relatively smooth to avoid resistance or snags in pulling cable 300 across surfaces during installation. Alternatively, as discussed herein, modifications to the surface of jacket 306 should preferably occur along the cable longitudinally so that potential snags during installation pulls are minimized or avoided.

Jacket 306 functions to encase, hold, and protect sub-units 302 within it. Other materials not shown in FIG. 3 may be added within the interior of jacket 306 to enhance these properties and without departing from the basic functionality of cable 300 discussed herein. For example, one or more aramid fibers may be disposed longitudinally inside jacket 306 for added strength to cable 300. In addition, powder may be dispersed around sub-units 302 to prevent jacket 306 from adhering to the sub-units. Powder may take the form of talc or water-swellable material, for example. Additionally, especially for outdoor MDU applications, superabsorbant SAP elements, i.e. SAP powder, SAP impregnated yarn, tape, or scrim, may be included under the jacket.

As depicted in FIG. 3, the exterior of jacket 306 includes at least two regions of weakness in the form of grooves 308A and 308B. Grooves 308A and 308B are regions in which the thickness of jacket 306 is less than in the remainder of the jacket. The reduced thickness in grooves 308A and 308B enables the jacket material to be torn or otherwise severed at the location of the grooves with less force than is required to sever other portions of the jacket.

Grooves 308A and 308B run in a longitudinal direction along the cable. In one embodiment of cable 300, grooves 308A and 308B are substantially parallel to each other and substantially parallel to the longitudinal axis of the cable. However, grooves 308A and 308B need not be so aligned with respect to each other or with respect to the cable's axis and may take any pattern desired on the surface of jacket 306. Moreover, grooves 308A and 308B need not be continuous along an entire segment of cable 300.

By weakening jacket 306 in defined locations, grooves 308A and 308B permit the jacket material to be torn open in a controlled manner to ease access to sub-units 302 inside. As such, a method of accessing optical fiber sub-units 302 within cable 300 for midspan access may include several steps.

First, as shown in FIG. 4A, accessing the optical fibers or sub-units 302 may initially include gripping cable 300 to locate grooves 308A and 308B. The small cable may be rotated in the user's fingers so that grooves 308A and 308B face the user and can be seen.

Figure 4B:
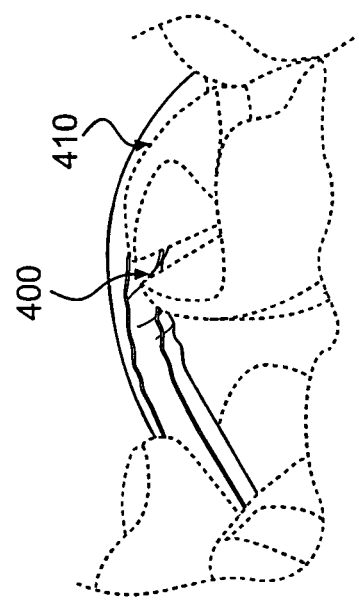
FIG. 4B is a side view of the optical fiber cable of FIG. 3 in a second step of accessing the optical fibers by twisting and flexing the cable according to a method consistent with certain disclosed embodiments.

Second, the jacket 306 can be intentionally buckled within the region between grooves 308A and 308B. Buckling or puckering, referenced generally as 400 in FIG. 4B, may occur by sharply bending cable 300 inwardly, as shown in FIG. 4B. By locating the crux of the bend of cable 300 between grooves 308A and 308B, the jacket material will be subjected to the highest compressive forces at this location. Additionally, the cable may be twisted and flexed to increase the buckling or ribbing that occurs to jacket 306.

Figure 4C:
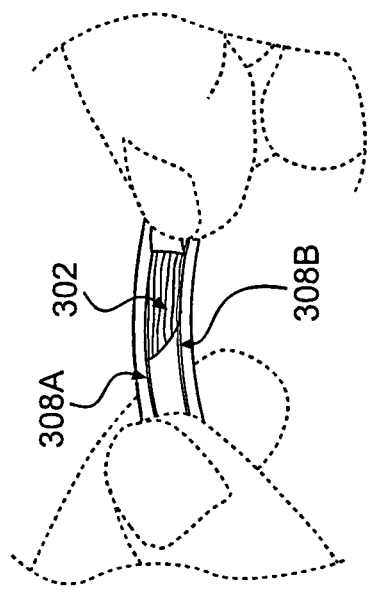
FIG. 4C is a side view of the optical fiber cable of FIG. 3 in a third step of accessing the optical fibers by cutting across grooves according to a method consistent with certain disclosed embodiments.

Third, as shown in FIG. 4C, the jacket 306 can be severed at one or more of the buckles or ribs 400 formed by bending. This severing occurs within the buckled segment of cable 300 and between the longitudinal grooves 308A and 308B. The severing can occur by cutting a buckle or rib 400 with a tool 410, such as a pair of shears, wire cutters, or a knife. Depending on the thickness and strength of the material of jacket 306, the severing could alternatively be accomplished with a user's fingernail. The cut may be made in any direction between grooves 308A and 308B, although a cut in a substantially circumferential direction on jacket 306 would be advantageous.

Figure 4D:
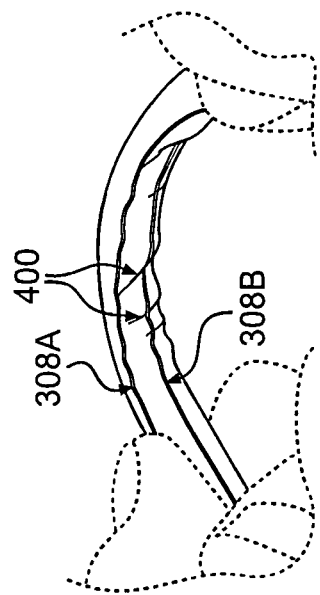
FIG. 4D is a side view of the optical fiber cable of FIG. 3 after the third step of accessing the optical fibers by cutting across grooves according to a method consistent with certain disclosed embodiments.

FIG. 4D illustrates the result of cutting jacket 306 at one of the buckles or ribs 400, where some of the sub-units 302 are exposed through the cut 412 formed in the jacket 306. By severing a buckle 400 that extends outwardly from cable 300, little possibility should exist of damaging the underlying sub-units 302.

Figure 4E:
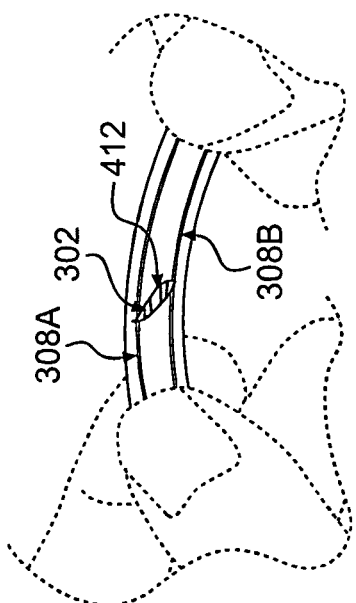
FIG. 4E is a side view of the optical fiber cable of FIG. 3 in a fourth step of accessing the optical fibers by peeling the jacket according to a method consistent with certain disclosed embodiments.

After severing of a portion of jacket 306 between grooves 308A and 308B, an edge of the jacket at the severed location 412 can be gripped and pulled longitudinally along the cable. Grooves 308A and 308B serve as stress concentrators, allowing the strip of jacket material between the grooves to be split from the rest of the jacket and peeled away with minimal force. Although gripping and peeling may occur using a tool, such as pliers, a user preferably could grab the edge of the jacket material within cut 412 and peel back a strip of the jacket by pulling, as shown in FIG. 4E.

Figure 4F:
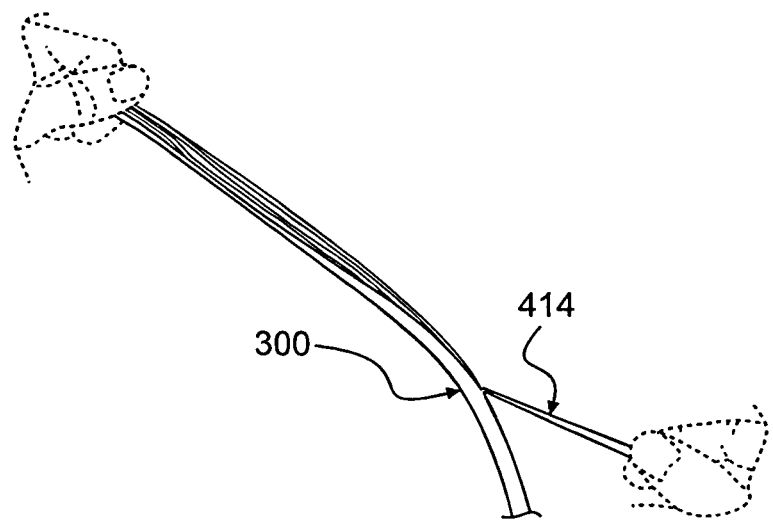
FIG. 4F is a side view of the optical fiber cable of FIG. 3 after the fourth step of accessing the optical fibers by peeling the jacket according to a method consistent with certain disclosed embodiments.

FIG. 4F shows that a strip 414 of jacket material can be separated from cable 300 in a "zipper" fashion. The length of the separation is at the discretion of the installer depending on factors such as the amount of access needed for splicing sub-units 302.

Figure 4G:
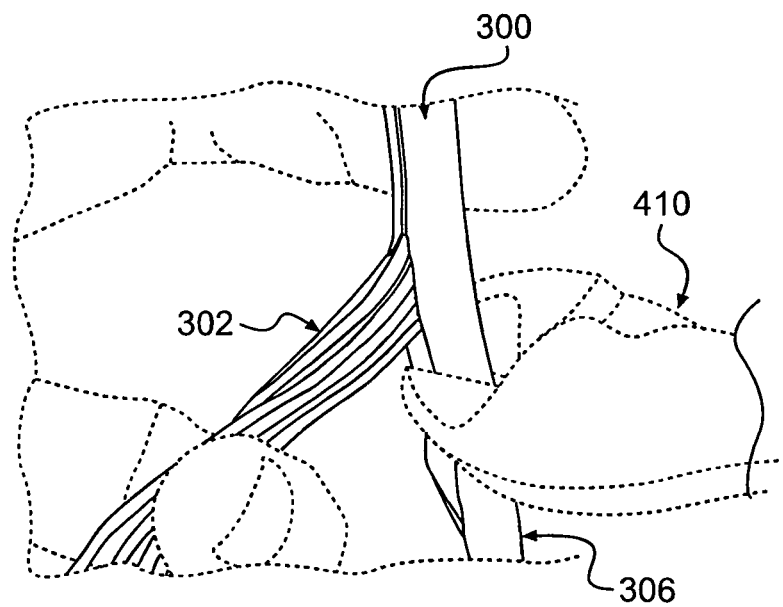
FIG. 4G is a side view of the optical fiber cable of FIG. 3 in a fifth step of accessing the optical fibers by cutting off the jacket according to a method consistent with certain disclosed embodiments.

Finally, as shown in FIG. 4G, sub-units 302 within cable 300 can then be removed from jacket 306. Since cable 300 does not include binder threads around sub-units 302, tedious steps of cutting and removing the binder threads are avoided. The user can then cut off any excess jacket material 306 with a tool 410, if desired.

As will be understood by those skilled in the art, variations to grooves 308A and 308B may modify the characteristics of opening cable 300 and accessing sub-units 302. For example, in one embodiment of cable 300 having a PVC jacket with an outer diameter of 7.5 mm and a thickness of approximately 0.5 mm, the grooves 308A and 308B are about 0.2 mm deep and run longitudinally along the cable axis in substantially straight lines 5 mm apart. For these parameters, it may be difficult to make the initial cut of a buckle 400 without tools, but the jacket material can be readily zipped open once the initial cut is made.

By increasing the depth of grooves 308A and 308B in this embodiment to approximately 0.3 mm, less force is required to sever the jacket at the grooves. Therefore, jacket 306 can be split open with a thumbnail. Once this is done, the strip of jacket material can be peeled or zippered back without the need for first making a circumferential cut of a buckle 400.

Similarly, by decreasing the jacket thickness of this embodiment to approximately 0.35 mm, less force would be required to penetrate jacket 306 at grooves 308A and 308B if the depth of those grooves remains at 0.2 mm. In addition, less force would be required to deliberately tear the jacket at any arbitrary location along cable 300. Consequently, with these dimensions, cable 300 can be opened more readily without the use of tools.

A preferred range of depths for grooves 308A and 308B is about 0.1 mm to 1 mm, although these dimensions can be greater or lesser depending on the jacket material used, the thickness of the jacket, and the desired ease of tearing open the jacket. In order to function effectively as a stress concentrator to produce preferential splitting of the jacket, the grooves would typically have depth equal to at least 15% of the jacket thickness.

Those of ordinary skill in the art will also appreciate that many different configurations for grooves 308A and 308B may be adopted. For example, jacket 306 may have two grooves in close proximity to one another, such as shown in FIG. 4A. The minimum distance between grooves 308A and 308B would be limited only by the resistance of the grooves to splitting. The tensile strength of the strip between grooves 308A and 308B that is peeled away must be sufficient to transmit the force necessary to tear the strip away from jacket 306. Roughly speaking, the product of the cross-sectional area of the strip between grooves 308A and 308B and the tensile strength of the jacket material must be greater than twice the tear strength of the grooved jacket (twice because the jacket will be torn along two lines simultaneously).

At one extreme, the width of the jacket strip between grooves 308A and 308B could be as little as twice the minimum thickness of jacket 306. In this instance, the minimum thickness of jacket 306 refers to the jacket thickness minus the depth of grooves 308A and 308B. While feasible, this dimension for the width of the jacket strip would make it more difficult for an installer to grip or handle the strip. Instead, widths of the strip between grooves 308A and 308B are preferred to be at least 3 mm, although limits on the dimension are not intended.

The existence and arrangement of grooves 308A and 308B are not limiting either. For example, the jacket may have only one longitudinally disposed groove (either 308A or 308B) on an external surface. The groove, which functions as an area of weakness in the jacket, facilitates midspan access of the sub-units when the groove is split and peeled open. With a single groove, the thin jacket could be cut, e.g. with a tool as described above, and then the jacket may be split along the single groove with the aid of a finger nail or using a seam ripper or other tool. After splitting along the single groove, the sub-units may be pulled to one side from the jacket, as depicted in FIG. 4G for ease of access.

In an embodiment for cable 300 having two grooves, the grooves could be located, for example, up to 180° apart from each other on opposite sides of cable 300. In this configuration, an installer could remove jacket 306 in two halves in a "banana peel" fashion, rather than pulling off a single narrow strip.

Alternatively, cable 300 may have three or four grooves, for example, uniformly distributed around the circumference of jacket 306. With three grooves, the installer could also remove jacket 306 in a "banana peel" fashion, albeit in three strips rather than in one or two. With four grooves arranged in pairs diametrically opposite one another, two strips can be peeled from the jacket on opposite sides of the cable, which may be useful for accessing sub-units 302 in larger cables having thicker jackets.

The overall dimensions of cable 300 are also flexible with respect to the particular application intended. For instance, the size and number of sub-units 302 could be changed to suit the installation requirements for mechanical performance and space. In space-constrained applications, the sub-units 302 could be 600 micron optical fibers with added aramid fibers or jacketing to increase its outer diameter to 1.2 mm. In applications that are more mechanically demanding, the outer diameter of the sub-units could be increased to 2.0 or 3.0 mm.

A cable such as that depicted as 380 in the attached figures provides numerous advantages for the installation of optical fibers, particularly within an MDU. For example, sub-units 302 are S-Z stranded unlike the bundled designs of the prior art discussed above. With S-Z stranding, the sub-units do not need to be unwound during access and installation. Moreover, during manufacturing, the sub-units can be stranded in a single pass, which can greatly decrease manufacturing time. The sub-unit pay-offs can be stationary, and the S-Z oscillation can be accomplished with rotating lay-plates, as is well known in the art.

In addition, because the jacket is solid and fairly robust, it will not split spontaneously. Accordingly, there is no need to secure it at the ends of segments prior to accessing the subunits or to secure binder threads with tapes to avoid the complete unraveling of the binder threads as is necessary in the bundled design of the prior art.

Advantages in the installation process with cable 300 are also evident. For instance, the process of severing jacket 306 at a buckle or rib 400 can make installation safer. The circumferential cut between grooves 308A and 308B can be made very quickly with commonly available tools (scissors, diagonal cutters, snips, etc.), avoiding the dangers inherent in ring-cutting to both the installer and the internal sub-units 302. And because only a single cut is required, fewer steps are involved compared with conventional cables, which may be ring-cut twice and then cut longitudinally with a tool.

Other embodiments of the invention will be apparent to those skilled in the art from consideration of the specification and practice of the invention disclosed herein.

It is intended that the specification and examples be considered as exemplary only, with a true scope and spirit of the invention being indicated by the following claims.

What is claimed is:

1. An optical fiber cable for bundled drop applications, comprising
    a plurality of optical fiber sub-units stranded together in an S-Z lay configuration, and
    a jacket surrounding and holding the stranded sub-units in the S-Z lay configuration without assistance from binder threads, the jacket contacting at least some of the sub-units and having at least one longitudinally disposed groove on an external surface to facilitate accessing the sub-units.

2. The optical fiber cable of claim 1, wherein the stranded sub-units are tight-buffered optical fibers.

3. The optical fiber cable of claim 2, wherein the tight-buffered optical fibers are from 600 to 1200 microns in diameter.

4. The optical fiber cable of claim 1, wherein the stranded sub-units are selected from the group consisting of loose optical fibers in tubes, optical fibers, and optical fiber ribbons.

5. The optical fiber cable of claim 1, further comprising powder dispersed around the stranded sub-units to prevent the jacket from adhering to the sub-units.

6. The optical fiber cable of claim 1, wherein the jacket has at least two longitudinally disposed grooves.

7. The optical fiber cable of claim 6, wherein a depth of each of the grooves is sufficient to permit peeling by hand the jacket material away from the cable between the grooves.

8. The optical fiber cable of claim 7, wherein the jacket has a thickness and the grooves have a depth of at least 15% of the thickness.

9. The optical fiber cable of claim 6, wherein the jacket has a thickness of between about 0.15 mm and 1.3 mm.

10. The optical fiber cable of claim 9, wherein the grooves have a depth of between about 0.1 mm and 1.0 mm.

11. The optical fiber cable of claim 6, wherein the jacket is sufficiently pliable to buckle between the grooves when bent.

12. An optical cable for rapid access and splicing of optical fibers, the cable consisting essentially of:
    a plurality of the optical fibers stranded in an S-Z configuration, the stranded optical fibers being tight-buffered, and
    a jacket encasing the stranded optical fibers and holding the stranded optical fibers in the S-Z configuration, the jacket including on an exterior surface at least one groove arranged longitudinally along the cable.

13. The optical fiber cable of claim 12, wherein the jacket includes at least two grooves arranged longitudinally along the cable.

14. The optical fiber cable of claim 13, wherein the jacket is sufficiently pliable to buckle between the grooves when bent.

15. The optical cable of claim 13, wherein the at least two grooves are substantially parallel to each other.

16. The optical cable of claim 13, wherein at least one of the grooves is substantially parallel to a longitudinal axis of the cable.

17. A method of accessing optical fiber sub-units in an optical fiber cable for bundled drop applications, the optical fiber cable including a plurality of optical fiber sub-units stranded together in an S-Z lay configuration, and a jacket surrounding and holding the stranded sub-units in the S-Z configuration without assistance from binder threads, wherein the jacket has at least two longitudinally disposed grooves to facilitate opening the jacket to access the sub-units, comprising
    bending the optical fiber cable until the jacket buckles between the longitudinal grooves,
    cutting the jacket within the buckled segment and between the longitudinal grooves at a cutting location; and
    peeling a portion of the jacket longitudinally between the grooves, starting at the cutting location, thereby revealing the optical fiber sub-units enclosed within the jacket.

18. An optical fiber cable for bundled drop applications, comprising
    a plurality of optical fiber sub-units stranded together in an S-Z lay configuration; and
    a jacket surrounding and holding the stranded sub-units in the S-Z lay configuration without assistance from binder threads, the jacket contacting at least some of the sub-units and having at least one longitudinally disposed groove on an external surface to facilitate accessing the sub-units,
    wherein the jacket comprises an inner surface having a substantially circular cross-sectional shape.

* * * * *